United States Patent Office 2,824,093
Patented Feb. 18, 1958

2,824,093

AZO DYESTUFFS

Jakob Benz, Basel, and Walter Wehrli, Riehen, Switzerland, assignors, by mesne assignments, to Saul & Co., Newark, N. J., as nominee of Fidelity Union Trust Company, executive trustee under Sandoz Trust No Drawing. Application September 28, 1953
Serial No. 382,834

Claims priority, application Switzerland October 3, 1952

8 Claims. (Cl. 260—146)

The present invention relates to substantive azo dyestuffs which correspond to the formula

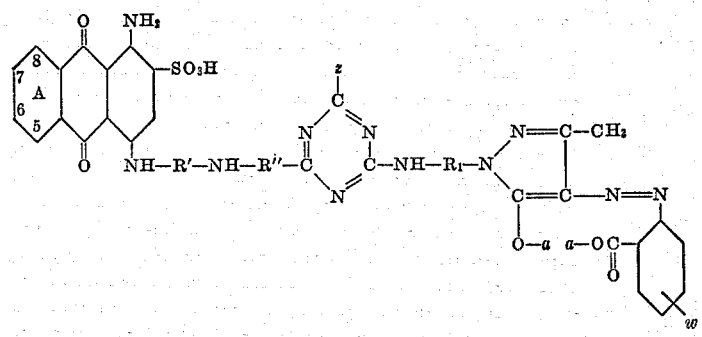

wherein each $a$ stands for a hydrogen atom or the 2$a$'s together represent —Cu—, $w$ stands for a hydrogen or chlorine atom or a sulfonic acid, sulfonic acid amide or substituted sulfonic acid amide group, $z$ stands for —Cl, —OH, —NH$_2$ or the residue of an amine, R$_1$ stands for a mononuclear radical of the benzene series or a binuclear radical of the benzene series wherein the two benzene nuclei are linked together by a —CH=CH— or a —NH.CO— bridge, R' stands for a mononuclear or binuclear radical of the benzene series, R'' stands for a simple bond or a residue of the formula

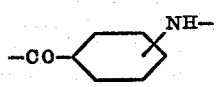

which may be further substituted in the benzene nucleus by methyl or methoxy, and wherein the nucleus A may be monosubstituted by —SO$_3$H in one of the 5-, 6-, 7- or 8-positions, or monosubstituted by chlorine in one of the 6- or 7-positions, or disubstituted by chlorine in both 6- and 7-positions.

The aforesaid substantive azo dyestuffs can be prepared by condensing, preferably in aqueous medium and in the presence of an acid-binding agent, one mol of a triazine compound, which contains at least two and at most three replaceable halogen atoms connected to carbon atoms, in any desired order of succession, on the one hand with one mol of a water-soluble and, if desired, coppered, aminomonoazo compound which in the uncoppered state corresponds to the formula

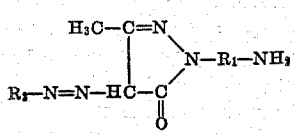

wherein R$_1$ has the previously-indicated significance, and R$_2$ stands for a radical of the benzene series containing a COOH group in ortho-position to the azo bridge, and, on the other hand, with one mol of a 1-aminoanthraquinone-2-sulfonic acid of the formula

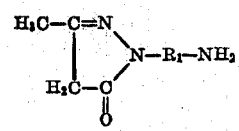

wherein R' and R'' have the previously-indicated significances and nucleus A may be substituted as previously set forth and then treating the resultant azo dyestuff, wherein if desired a third halogen atom of the triazine ring may be replaced by —OH, —NH$_2$ or the radical of an amine, with a copper-yielding agent, the treatment being carried out with the dyestuff in substance or on the fiber.

Alternatively one mol of the triazine compound may be condensed in any desired order of succession with one mol of a 1-aminoanthraquinone-2-sulfonic acid (b) and with 1 mol of water-soluble 5-pyrazolone of the formula $$\begin{array}{c} H_3C-C=N \\ \phantom{H_3C-}\big| \phantom{aaaa} \diagdown N-R_1-NH_2 \\ H_2C-O \phantom{aa} \diagup \\ \phantom{aaaaa}\| \\ \phantom{aaaaa}O \end{array}$$ (c)

wherein R$_1$ has the precedingly-recited significance, coupling the resultant condensation product with one mol of the diazo compound of an amine of the benzene series containing COOH group in ortho-position to the amino group and then treating the resultant azo dyestuff, in which if desired a third halogen atom of the triazine ring may be replaced by —OH, —NH$_2$ or the radical of an amine, with a copper-yielding agent, the dyestuff being treated in substance or on the fiber. The last-mentioned replacement may, if desired, be carried out before coupling the condensation product with the diazotized amine.

In the aminomonoazo compounds of the formula $a$, employed in preparing the azo dyestuffs of the present invention, according to the first described process embodiment, the symbol R$_1$ represents a phenyl radical, a stilbenyl radical, or a benzoylaminophenyl radical, which radicals may be further substituted. The preferred R$_1$ radicals is the stilbenyl radical, the presence of which in the dyestuff molecule imparts particularly good properties to the product. Possible substituents for the phenyl and benzoylaminophenyl radicals are preferably halogen atoms (for example chlorine), alkyl radicals (for example methyl), alkoxy radicals (for example methoxy, ethoxy, etc.) sulfonic acid groups and sulfonic acid amide groups which may be alkylated, cycloalkylated, aralkylated or arylated at the nitrogen, while preferred substituents for the stilbenyl radical are sulfonic acid groups. $R_2$ moieties are the 2-aminobenzene-1-carboxylic acid moieties and derivatives thereof substituted by halogen (for example chlorine), alkoxy (for example methoxy, ethoxy, etc.), or acylamino (for example acetylamino). Preferred representatives of this series are also the 1-carboxy-2-aminobenzene-4- and -5-sulfonic acids and sulfonic acid amides. The latter may be substituted at the nitrogen atoms of the sulfonic acid amide groups, for example by alkyl, cycloalkyl, aralkyl or aryl; especially preferred in this connection are the methylamides, 2'-hydroxyethylamides and 2'-carboxyphenylamides.

The aminomonoazo compounds of the formula a are prepared by coupling the diazotized 2-aminobenzene-1-carboxylic acids with the 1-(amino)-phenyl- or 1-(aminobenzoylamino)-phenyl- or 1-(4''-amino)-stilbenyl-(4')-3-methyl-5-pyrazolones in advantageously neutral or weakly acid medium.

The aminopyrazolones and 2-aminobenzene-1-carboxylic acids, employed for the second process embodiment of the invention, are preferably the same as those described for the preparation of the aminomonoazo compounds (a) required for carrying out the first process embodiment of the invention. The coupling of the diazo compounds with the secondary or tertiary condensation products is here advantageously carried out in neutral or alkaline medium.

The 1-aminoanthraquinone-2-sulfonic acids of formula b which are employed in both aforedescribed process embodiments are obtained by the condensation of 1-amino-4-halogenanthraquinone-2-sulfonic acids with diaminobenzenes, diaminodiphenyls, diaminobenzoylaminobenzenes and diaminobenzoylaminodiphenyls, which diamino compounds may advantageously be substituted by alkyl, alkoxy, carboxy or sulfo groups. The last two enumerated compound types (diaminobenzoylaminobenzenes and diaminobenzoylaminodiphenyls) can also be prepared by treating the condensation products of 1-amino-4-halogenanthraquinone-2-sulfonic acids and diaminobenzenes or diaminodiphenyls with nitrobenzoyl halides, followed by reduction of the nitro group to the amino group. The condensation of 1-amino-4-halogenanthraquinone-2-sulfonic acids can also be carried out with compounds of the benzene or diphenyl series which contain only one amino group and in addition a substituent which is readily convertible into an amino group, as for example the nitro group or a readily saponifiable acylamino group. The conversion of this substituent into the amino group has to be effected prior to the condensation of the anthraquinone derivatives with the triazine compound. The 1-aminoanthraquinone-2-sulfonic acids (b) are used as free acids or in the form of their salts. Technical mixtures, such for example as the 2,5- and 2,8-disulfonic acid mixture or the 2,6- and 2,7-disulfonic acid mixture, can be used as such, without preliminary separation into the individual components.

Triazine compounds with at least two and at most three replaceable halogen atoms connected to carbon atoms, and which are particularly suitable for the preparation of a monoazo dyestuff of the present invention, comprise, for example, cyanuric chloride, cyanuric bromide, 1-methyl-3,5-dichlorotriazine, 1-phenyl-3,5-dichlorotriazine, etc.

The condensation of amines with triazine compounds containing replaceable halogen atoms is known. It is known that the preparation of the primary condensation product, i. e. the replacement of the first halogen atom by the radical of an amine, proceeds readily. For this reason, this phase is carried out at about 0° C. The substitution of the second halogen atom by the radical of an amine requires a somewhat higher reaction temperature, for example 30–50° C., while the replacement of the third halogen atom which may be present can be carried out only at elevated temperature, for example at 80–100° C., and with a readily reacting amine. Such readily reacting amines are for example aminobenzene, 1-amino-4-acetylaminobenzene, N-methylaminobenzene, methylamine and monoethanolamine. The said third halogen atom can also be replaced by hydroxy or by amino.

The uncoppered dyestuffs of the present invention dye cotton and fibers of regenerated cellulose in pure green shades. They contain, in the pyrazolone-azo moiety, a metallizable group which can be coppered on the fiber by a single bath process or by an after-coppering process. The coppered dyeings are characterized by good fastness to light, to washing and to perspiration.

The dyestuffs can also be coppered in substance. This coppering is carried out according to any one of the various methods known from the literature, for example by heating the dyestuff with a copper salt in a weakly acid to alkaline medium, if desired with the use of pressure and/or in the presence of ammonia or of an organic base such as diethanolamine, pyridine, or quinoline, or in a melt of an alkali salt of a low molecular aliphatic monocarboxylic acid.

The metallized azo dyestuffs dye cotton and fibers of regenerated cellulose in similar shades as the uncoppered dyestuffs. The dyeings are fast to light, to washing, and to perspiration.

The dyeings of practically all the uncoppered and metallized dyestuffs of the present invention can also be treated with cation-active copper complex compounds, which may be basic (such as are obtainable according to Swiss Patents Nos. 253,709 and 261,048–052), whereby enhanced fastness properties, particularly as regards light-, wash- and perspiration-fastness, are obtained.

The following examples are illustrative of the invention. In these examples, the parts are parts by weight, the percentages are by weight and the temperatures are in degrees centigrade. The preparation of the respective intermediate is known from the literature.

EXAMPLE 1

A neutral solution of 67.9 parts of the aminomonoazo compound, obtainable by coupling diazotized 1-carboxy-2-aminobenzene-5-sulfonic acid with 1-[4''-amino-1',1''-stilbenyl-(4')]-3-methyl-5-pyrazolone-2',2''-disulfonic acid, in 1000 parts of water is added at 0–3° in the course of 30 minutes to a suspension of 18.4 parts of cyanuric chloride in 300 parts of ice water. The resultant mass is stirred for one hour at 0–3°, care being taken by the dropwise addition of dilute aqueous sodium carbonate solution that the condensation mixture constantly has a weakly acid reaction. Thereupon a neutral solution of 40.9 parts of 1-amino-4-(4'-amino)-phenylaminoanthraquinone-2-sulfonic acid in 800 parts of water are added dropwise to the monocondensation product. The temperature of the mass is then raised to 40–45° and stirring carried out at this temperature for two hours, the reaction of the mixture being maintained weakly acid throughout by the addition of dilute aqueous sodium carbonate solution. After the addition of 18 parts of aminobenzene, the reaction mass is heated for one hour to 90–95°. The now-present tertiary condensation product is then salted out, filtered, and dried. It corresponds to the formula fonate in 800 parts of water are added at 0–3° to a suspension of 18.4 parts of cyanuric chloride in 300 parts of ice water. The mixture is stirred for two hours at this

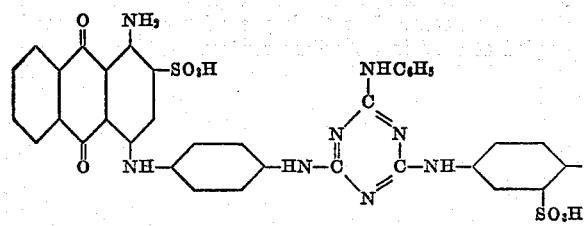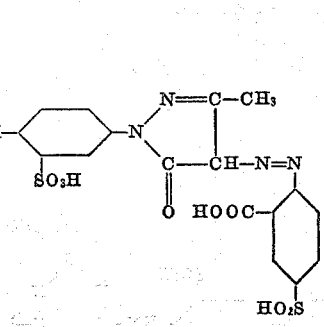

and dyes cotton and fibers of regenerated cellulose in green shades, the fastness properties of which are considerably improved by treatment with copper-yielding agents.

The dyestuff can be coppered in substance. To this end, it is suspended in 1000 parts of water at 85°, and to the suspension there is gradually added a solution of 25 parts of crystalline copper sulfate, 40 parts of a 25% aqueous ammonium hydroxide solution and 100 parts of water. The mixture is maintained at 90–95° for 30 minutes and, upon completion of the ensuing coppering, the dyestuff is isolated. It corresponds to the formula temperature and, during this operation, a dilute aqueous sodium carbonate solution is added dropwise at such a rate that the reaction mixture is constantly weakly acid. Thereupon a neutral solution of 67.8 parts of the aminomonoazo compound, obtained by coupling diazotized 1-carboxy-2-aminobenzene-5-sulfonic acid amide with 1-[4″-amino-1′,1″-stilbenyl-(4′)]-3-methyl - 5 - pyrazolone-2′,2″-disulfonic acid, in 500 parts of water are added dropwise to the monocondensation product. The temperature of the mass is then raised to 35–40° in the course of one hour, during which time care is taken that the reaction remains weakly acid by the dropwise addition of

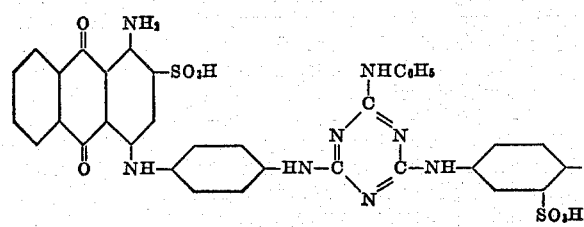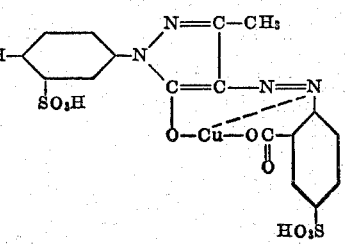

The green dyeing produced on cellulose fibers with this copper complex compound are characterized by very good fastness to light, to washing and to perspiration.

EXAMPLE 2

A solution of 60.9 parts of sodium 1-amino-4-[4′-(4″-amino)-phenyl]-phenylaminoanthraquinone-2,3″ - disuldilute sodium carbonate solution. The mixture is then stirred for some additional time at 40°, after which 18 parts of aminobenzene are added thereto and the temperature then maintained at 90–95° for one hour. The so-obtained tertiary condensation is salted out, filtered and dried. It corresponds to the formula

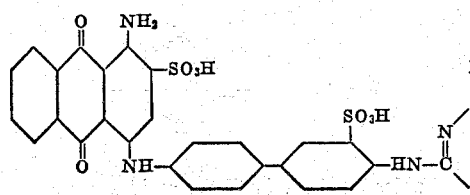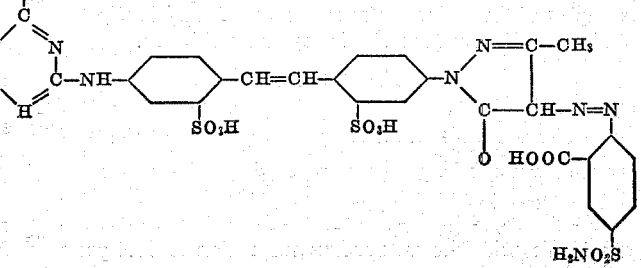

and dyes cotton and fibers of regenerated cellulose in green shades the fastness properties of which are improved by treatment with copper-yielding agents.

The preparation of the copper complex compound in substance may be carried out, for example according to the process set forth in Example 1. Such copper complex compound corresponds to the formula of cyanuric chloride according to the data set forth in Example 1, followed by condensation of the primary condensation product with 40.9 parts of 1-amino-4-(4'-amino)-phenylaminoanthraquinone-2-sulfonic acid and reaction of the secondary condensation product with 18 parts of aminobenzene. The tertiary condensation product is coupled at 0–5° in a medium rendered alkaline with so-

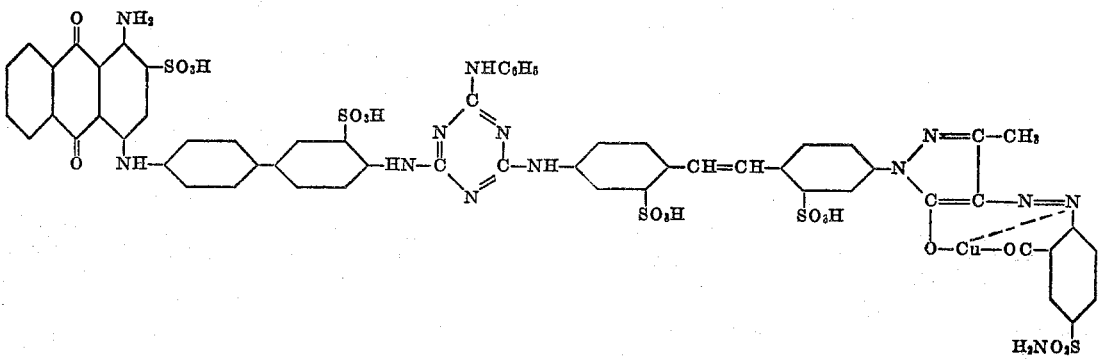

EXAMPLE 3

The cupriferous monoazo dyestuff described in Example 1 is also obtained when, in lieu of the 67.9 parts of the aminomonoazo compound of Example 1, use is made of the corresponding quantity of copper complex thereof, obtained for instance by coppering the aminomonoazo compound with copper sulfate in an aqueous solution containing sodium acetate.

The copper complex compound is dissolved in 1000 parts of water in the presence of 5 parts of lithium carbonate and 10 parts of sodium carbonate. The solution is then added dropwise to a suspension of 18.4 parts of cyanuric chloride and 300 parts of water. The temperature of the condensation mass is held at 0–3°; the reaction mixture is maintained weakly acid throughout by the dropwise addition of dilute lithium carbonate solution. The so-obtained monocondensation product is reacted, after the manner described in Example 1, with 40.9 parts of 1-amino-4-(4'-amino)-phenylaminoanthraquinone-2-sulfonic acid, after which the resultant secondary condensation product is reacted with 18 parts of aminobenzene. The produced tertiary condensation product is precipitated from the hot condensation solution by the addition of potassium carbonate and a small quantity of potassium chloride, after which it is filtered hot, washed with 5% aqueous sodium chloride solution and finally dried.

The identical cupriferous monoazo dyestuff is obtained when first the anthraquinone derivative, then the copper complex of the aminomonoazo compound, and finally the aminobenzene are reacted with cyanuric chloride.

EXAMPLE 4

The uncoppered monoazo dyestuff described in Example 1 can also be prepared by reacting an aqueous solution of 49.5 parts of the disodium salt of 1-[4''-amino-1,1''-stilbenyl-(4')]-3-methyl-5-pyrazolone-2',2''-disulfonic acid with an aqueous suspension of 18.4 parts of cyanuric chloride according to the data set forth in Example 1, followed by condensation of the primary condensation product with 40.9 parts of 1-amino-4-(4'-amino)-phenylaminoanthraquinone-2-sulfonic acid and reaction of the secondary condensation product with 18 parts of aminobenzene. The tertiary condensation product is coupled at 0–5° in a medium rendered alkaline with sodium carbonate, with the diazo compound of 21.7 parts of 1-carboxy-2-aminobenzene-5-sulfonic acid. The identical monoazo dyestuff is obtained when the 18.4 parts of cyanuric chloride are first condensed with 40.9 parts of 1-amino-4-(4'-amino)-phenylaminoanthraquinone-2-sulfonic acid, then with 49.5 parts of 1-[4''-amino-1',1''-stilbenyl-(4')]-3-methyl-5-pyrazolone-2',2''-disulfonic acid and finally with 18 parts of aminobenzene, and then the resultant tertiary condensation product coupled with the diazo compound of 21.7 parts of 1-carboxy-2-aminobenzene-5-sulfonic acid.

The two modes of procedure set forth in the preceding two paragraphs can be modified in that the diazotized 1-carboxy-2-aminobenzene-5-sulfonic acid is not coupled with the tertiary condensation product, but rather—in similar manner—coupled with the secondary condensation product and the conversion of the latter into the tertiary condensation product only thereafter carried out.

The uncoppered monoazo dyestuff obtained according to the foregoing methods can be coppered in substance or on the fiber.

The following tables set forth further azo dyestuffs which can be prepared according to the processes described in Examples 1–4. All these azo dyestuffs correspond to the formula

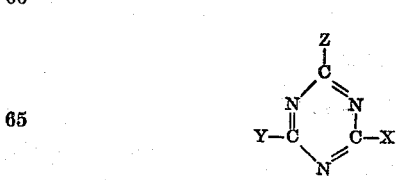

Tables I–III set forth the amides corresponding to the substituents X, Y and Z. In Table IV the symbols X and Y also indicate the corresponding amines; however, in this table, the symbol Z designates the substituent itself.

All the azo dyestuffs of the tables dye cotton and fibers of regenerated cellulose in green shades with very good fastness to light, to washing and to perspiration.

Table I

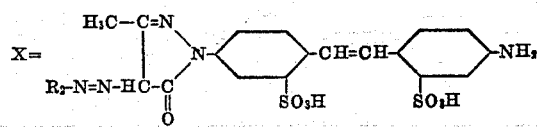

X =

| (1) Ex. No. | (2) Y | (3) Z | (4) R₂ = Radical of— |
|---|---|---|---|
| 5 | 1-amino-4-(4'-amino)-phenylaminoanthraquinone-2,3'-disulfonic acid. | Aminobenzene | 2-aminobenzene-1-carboxylic acid. |
| 6 | do | do | 1-carboxy-2-aminobenzene-4-sulfonic acid. |
| 7 | 1-amino-4-(4'-amino)-phenylaminoanthraquinone-2-sulfonic acid. | do | 2-aminobenzene-1-carboxylic acid. |
| 8 | do | do | 1-carboxy-2-aminobenzene-5-sulfonic acid amide. |
| 9 | do | Methylamine | Do. |
| 10 | 1-amino-4-(methyl-4'-amino)-phenylaminoanthraquinone-2-sulfonic acid. | Aminobenzene | 1-carboxy-2-aminobenzene-5-sulfonic acid. |
| 11 | 1-amino-4-(methoxy-4'-amino)-phenylaminoanthraquinone-2-sulfonic acid. | do | Do. |
| 12 | 1-amino-4-(4'-amino)-phenylaminoanthraquinone-2,6-disulfonic acid. | do | 2-amino-5-chlorobenzene-1-carboxylic acid. |
| 13 | do | do | 2-aminobenzene-1-carboxylic acid. |
| 14 | 1-amino-4-[4'-(4''-amino)-phenyl]-phenylaminoanthraquinone-2,3''-disulfonic acid. | do | Do. |
| 15 | do | do | 1-carboxy-2-aminobenzene-5-sulfonic acid. |
| 16 | do | Methylamine | Do. |
| 17 | do | do | 1-carboxy-2-aminobenzene-5-sulfonic acid-(2'-hydroxy)-ethylamide. |
| 18 | do | Ethanolamine | 1-carboxy-2-aminobenzene-5-sulfonic acid-methylamide. |
| 19 | 1-amino-4-[4'-(4''-amino)-phenyl]-phenylaminoanthraquinone-2,3''-disulfonic acid. | do | 1-carboxy-2-aminobenzene-5-sulfonic acid-cyclohexylamide. |
| 20 | do | Diethanolamine | 1-carboxy-2-aminobenzene-5-sulfonic acid-(2'-carboxy)-phenylamide. |
| 21 | 1-amino-4-[4'-(4''-amino)-phenyl]-phenylamino-6,7-dichloroanthraquinone-2,3''-disulfonic acid. | 1-aminobenzene-4-sulfonic acid. | 1-carboxy-2-aminobenzene-5-sulfonic acid-di-[(2'-hydroxy)-ethyl]-amide. |
| 22 | 1-amino-4-[(4'-[4''-(4'''-amino)-benzoylamino]-phenyl)]-phenylaminoanthraquinone-2,3''-disulfonic acid. | Aminobenzene | 1-carboxy-2-aminobenzene-5-sulfonic acid. |
| 23 | 1-amino-4-(ethoxy-4'-amino)-phenylaminoanthraquinone-2-sulfonic acid. | do | Do. |
| 24 | 1-amino-4-(3'-carboxy-4'-amino)-phenylaminoanthraquinone-2-sulfonic acid. | do | Do. |
| 25 | 1-amino-4-(4'-amino)-phenylaminoanthraquinone-2,5-disulfonic acid. | do | 1-carboxy-2-aminobenzene-5-sulfonic acid-morpholylamide. |
| 26 | 1-amino-4-(4''-amino)-phenylaminoanthraquinone-2,8-disulfonic acid. | Methylamine | 1-carboxy-2-aminobenzene-5-sulfonic acid-amide. |
| 27 | 1-amino-4-(4'-amino)-phenylaminoanthraquinone-2,7-disulfonic acid. | Ethanolamine | 1-carboxy-2-aminobenzene-5-sulfonic acid-phenylamide. |
| 28 | do | Aminobenzene | 1-carboxy-2-aminobenzene-5-sulfonic acid-benzylamide. |
| 29 | 1-amino-4-[4'-(4''-amino)-phenyl]-phenylamino-6-chloroanthraquinone-2,3''-disulfonic acid. | Ethanolamine | 1-carboxy-2-aminobenzene-5-sulfonic acid. |
| 30 | 1-amino-4-[4'-(4''-amino)-phenyl]-phenylamino-7-chloroanthraquinone-2,3''-disulfonic acid. | do | Do. |

Table II

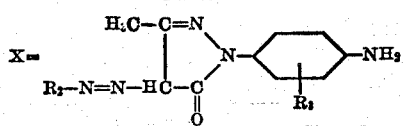

X =

| (1) Ex. No. | (2) Y | (3) Z | (4) R₂ = Radical of— | (5) R₃ |
|---|---|---|---|---|
| 31 | 1-amino-4-(4'-amino)-phenylaminoanthraquinone-2,8-disulfonic acid. | Aminobenzene | 1-carboxy-2-aminobenzene-5-sulfonic acid. | —H |
| 32 | 1-amino-4-(4'-amino)-phenylaminoanthraquinone-2,6-disulfonic acid. | do | 1-carboxy-2-aminobenzene-5-sulfonic acid-amide. | —H |
| 33 | do | Methylamine | do | —H |
| 34 | do | Ethanolamine | do | —CH₃ |
| 35 | 1-amino-4-[4'-(4''-amino)-phenyl]-phenylaminoanthraquinone-2,3''-disulfonic acid. | 1-amino-4-acetylaminobenzene | 1-carboxy-2-aminobenzene-5-sulfonic acid. | —H |
| 36 | do | Methylamine | do | —OCH₃ |
| 37 | do | Ethanolamine | do | —Cl |
| 38 | do | 4-amino-1,1'-azobenzene | do | —H |
| 39 | do | 4-amino-4'-hydroxy-1,1'-azobenzene-3'-carboxylic acid. | do | —H |
| 40 | 1-amino-4-[4'-(4''-amino)-phenyl]-phenylaminoanthraquinone-2,3''-disulfonic acid. | 1-amino-4-methylbenzene | do | —H |
| 41 | do | 1-amino-4-chlorobenzene | do | —H |
| 42 | do | Aminobenzene | 1-carboxy-2-aminobenzene-5-sulfonic acid-amide. | —H |
| 43 | do | Methylamine | do | —H |
| 44 | 1-amino-4-[4'-(4''-amino)-benzoylamino]-phenylaminoanthraquinone-2,6-disulfonic acid. | Aminobenzene | 1-carboxy-2-aminobenzene-5-sulfonic acid. | —H |
| 45 | 1-amino-4-[4'-(4''-amino)-benzoylamino]-phenylaminoanthraquinone-2,3'-disulfonic acid. | do | do | —H |

Table III

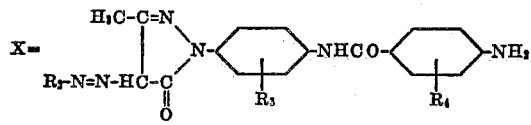

| Ex. No. | Y | Z | $R_2$=radical of— | $R_3$ | $R_4$ |
|---|---|---|---|---|---|
| 46 | 1-amino-[4'-(4''-amino)-phenyl]-phenyl-aminoanthraquinone-2,3''-disulfonic acid. | Methylamine | 1-carboxy-2-aminobenzene-5-sulfonic acid. | —H | —H |
| 47 | ....do.... | Ethanolamine | ....do.... | —H | —H |
| 48 | ....do.... | ....do.... | ....do.... | —CH₃ | —H |
| 49 | ....do.... | ....do.... | ....do.... | —H | —CH₃ |
| 50 | ....do.... | ....do.... | ....do.... | —H | —OCH₃ |
| 51 | ....do.... | ....do.... | ....do.... | —OCH₃ | —H |

Table IV

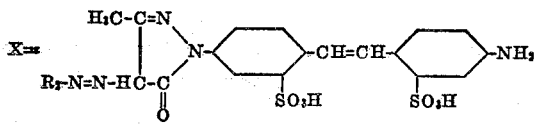

| Ex. No. | Y | Z | $R_2$=radical of— |
|---|---|---|---|
| 52 | 1-amino-4-[4'-(4''-amino)-phenyl]-phenylaminoanthraquinone-2,3''-disulfonic acid. | —OH | 1-carboxy-2-aminobenzene-5-sulfonic acid-amide. |
| 53 | ....do.... | —NH₂ | Do. |
| 54 | ....do.... | —Cl | Do. |

The formulae of representative examples are for instance:

EXAMPLE 13

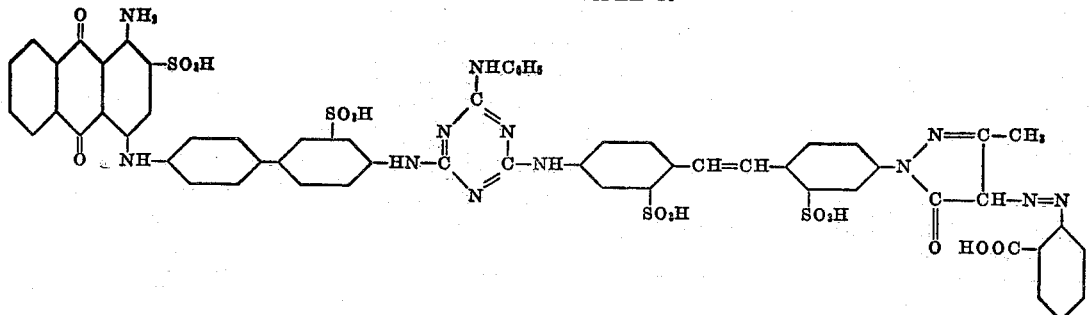

EXAMPLE 14

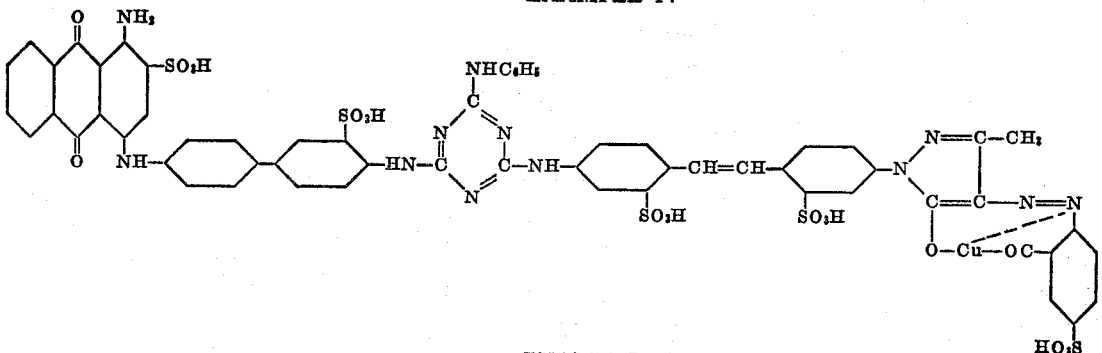

EXAMPLE 15

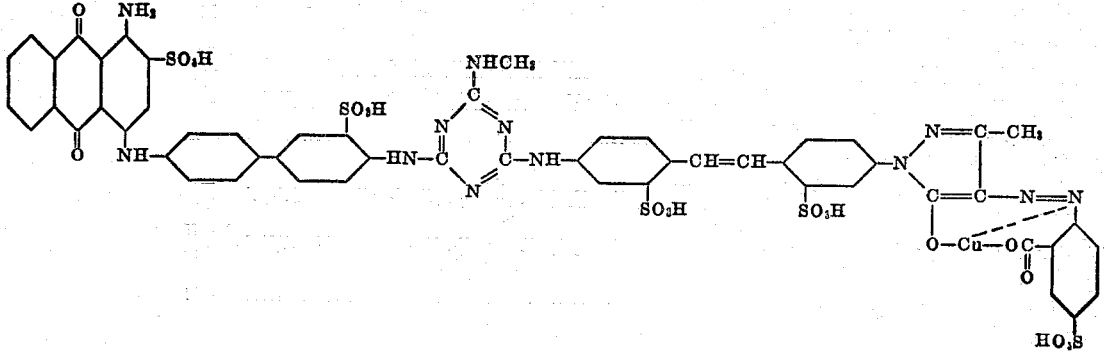

EXAMPLE 55

1 part of the uncoppered monoazo dyestuff prepared according to Example 1 is dissolved in 200 parts of water at 100°. This solution is poured into 3400 parts of water, 50 parts of anhydrous sodium sulfate are added, and then 125 parts of pre-wetted cotton material are entered at 20–30°. The bath is heated to 90–95° and maintained at this temperature for 30 minutes. Thereupon it is allowed to boil for 15 minutes and then to cool down to 75°. The dyed material is then rinsed and dried.

The thus-treated dyed cotton is, for after treatment purposes, introduced into a bath consisting of 2500 parts of water, 3.75 parts of crystalline copper sulfate and 3.75 parts of acetic acid, and the material treated in the said bath at 60° for 20 minutes. The material is then rinsed and dried.

EXAMPLE 56

1 part of the coppered dyestuff obtained according to paragraph 2 of Example 1 is dissolved in 200 parts of water at 100°. This solution is poured into 3400 parts of water, 40 parts of anhydrous sodium sulfate are added, and 110 parts of pre-wetted cotton or viscose yarn are entered at 20–30°. The bath is warmed to 93° and the material thoroughly moved around therein for 30 minutes. The bath is then allowed to cool to 70°, and the material rinsed and dried.

EXAMPLE 57

The dyeings obtained according to Examples 55 and 56 may also be after treated as follows: The rinsed dyeing is manipulated for 30 minutes at 60–70° in a bath consisting of 3000 parts of water and 3 parts of a cupriferous condensation product built up on the basis of dicyandiamide, after which the coppered dyeing is rinsed and dried.

Having thus disclosed the invention, what is claimed is:

1. A member selected from the group consisting of azo dyestuffs which correspond to the formula

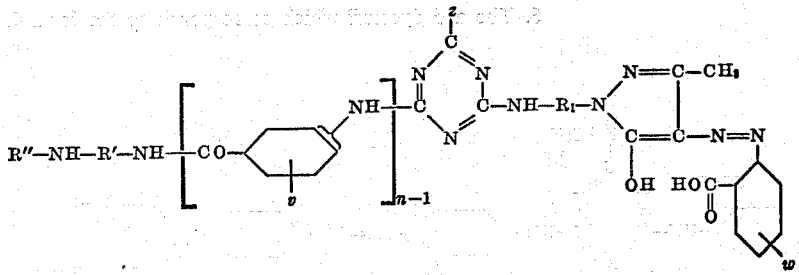

and complex copper compounds thereof, wherein $n$ stands for one of the numerals 1 and 2; $v$ stands for a member selected from the group consisting of hydrogen, methyl and methoxy; $w$ stands for a member selected from the group consisting of H, Cl, —SO$_3$H, and sulfonic acid amide, sulfonic acid morpholide, N-lower alkyl sulfonic acid amide, N-lower hydroxyalkyl sulfonic acid amide, N-cycloalkyl sulfonic acid amide, N-aralkyl sulfonic acid amide and N-aryl sulfonic acid amide groups; $z$ stands for a member selected from the group consisting of Cl, OH, NH$_2$, lower alkylamino, lower hydroxyalkylamino, mononuclear carbocyclic arylamino and monoamino-monoazobenzene radicals; $R_1$ stands for a member selected from the group consisting of mononuclear radicals of the benzene series and binuclear radicals of the benzene series wherein the two benzene nuclei are linked together by a bridge selected from the group consisting of —CH=CH— and —NH.CO—, each of the last-mentioned two benzene nuclei containing a sulfonic acid group in ortho-position to the said bridge when the latter is —CH=CH—; R' stands for a member selected from the group consisting of mononuclear and binuclear radicals of the benzene series; and R'' is a member selected from the group consisting of the 1-aminoanthraquinone-2-sulfonic acid group, the 1-aminoanthraquinone-2,5-disulfonic acid group, the 1-aminoanthraquinone-2,6-disulfonic acid group, the 1-aminoanthraquinone-2,7-disulfonic acid group, the 1-aminoanthraquinone-2,8-disulfonic acid group, the 1-amino-6-chloroanthraquinone-2-sulfonic acid group, the 1-amino-7-chloroanthraquinone-2-sulfonic acid group and the 1-amino-6,7-dichloroanthraquinone-2-sulfonic acid group, the R'' group being connected in the 4-position of the anthraquinone nucleus to the adjacent —NH—R'—NH— group.

2. An azo dyestuff which corresponds to the formula

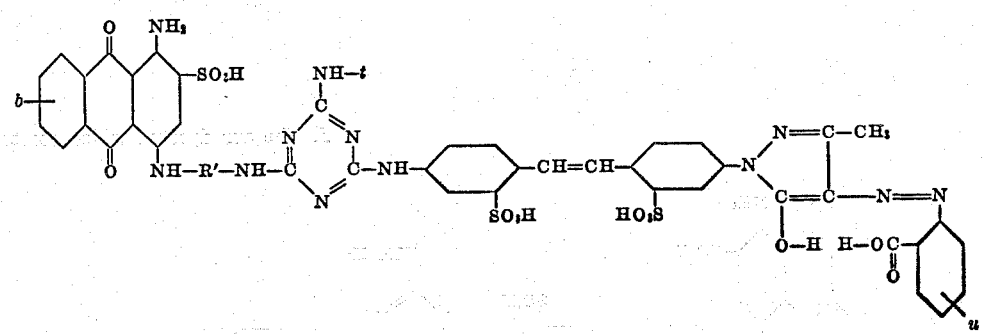

wherein $u$ stands for a member selected from the group consisting of hydrogen, sulfonic acid and sulfonic acid amide; $b$ stands for a member selected from the group consisting of hydrogen and sulfonic acid; $t$ stands for a member selected from the group consisting of phenyl and methyl, and R' stands for a member selected from the group consisting of a mononuclear and a binuclear radical of the benzene series.

3. An azo dyestuff which corresponds to the formula

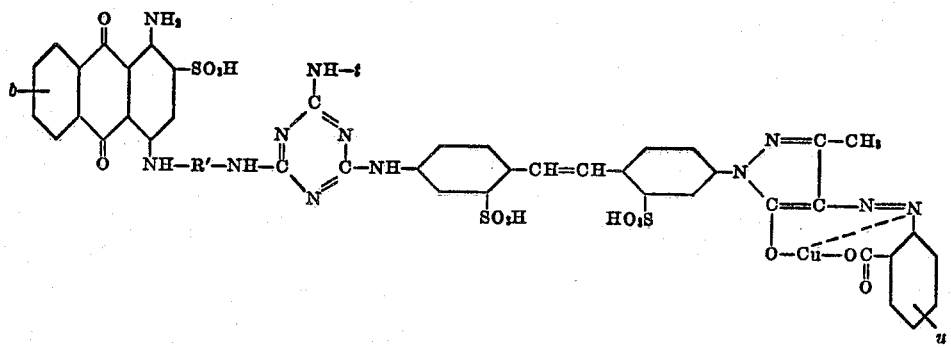

wherein $u$ stands for a member selected from the group consisting of hydrogen, sulfonic acid and sulfonic acid amide; $b$ stands for a member selected from the group consisting of hydrogen and sulfonic acid; $t$ stands for a member selected from the group consisting of phenyl and methyl, and R' stands for a member selected from the group consisting of a mononuclear and a binuclear radical of the benzene series.

4. The azo dyestuff which corresponds to the formula

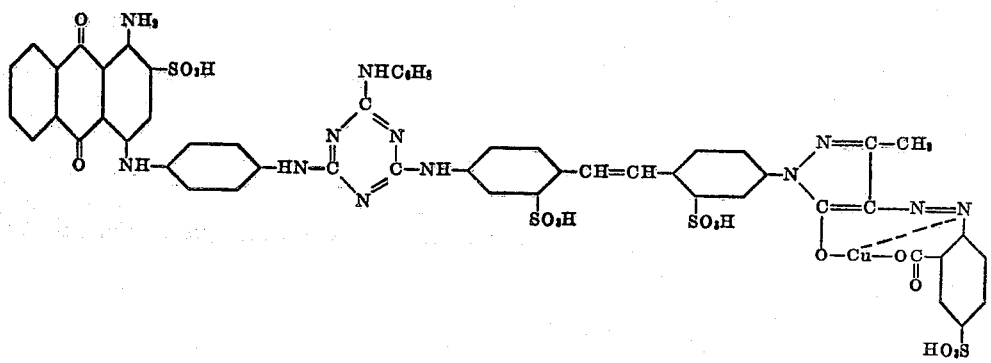

5. The azo dyestuff which corresponds to the formula

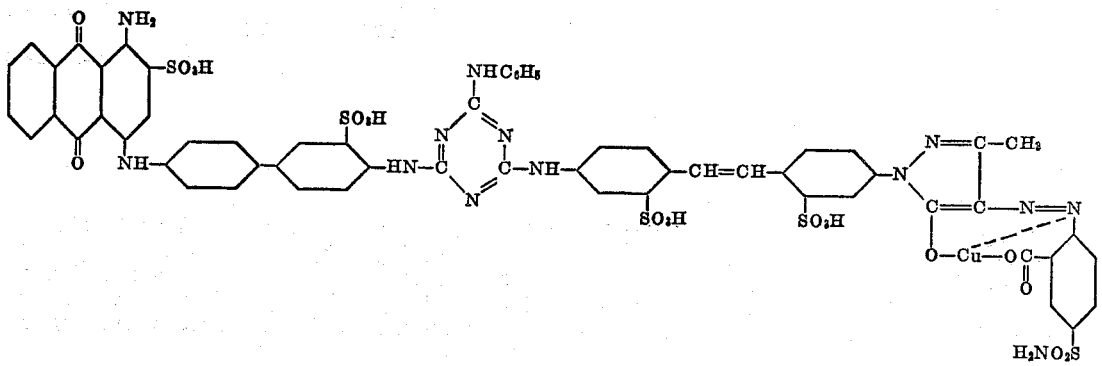

6. The azo dyestuff which corresponds to the formula

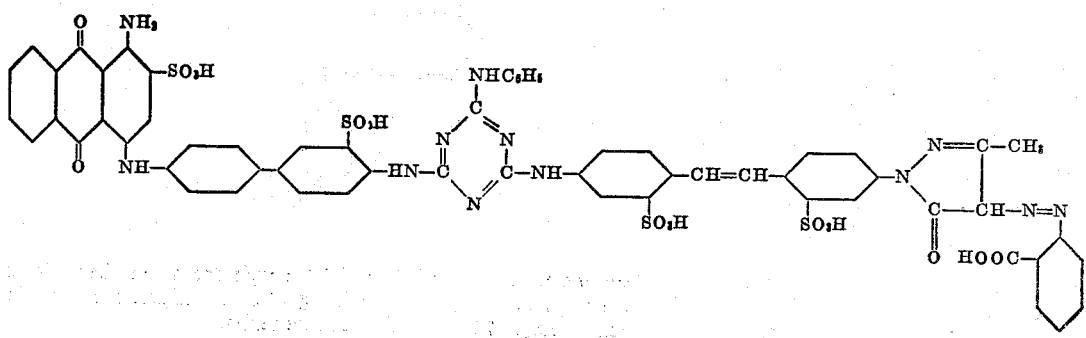

7. The azo dyestuff which corresponds to the formula
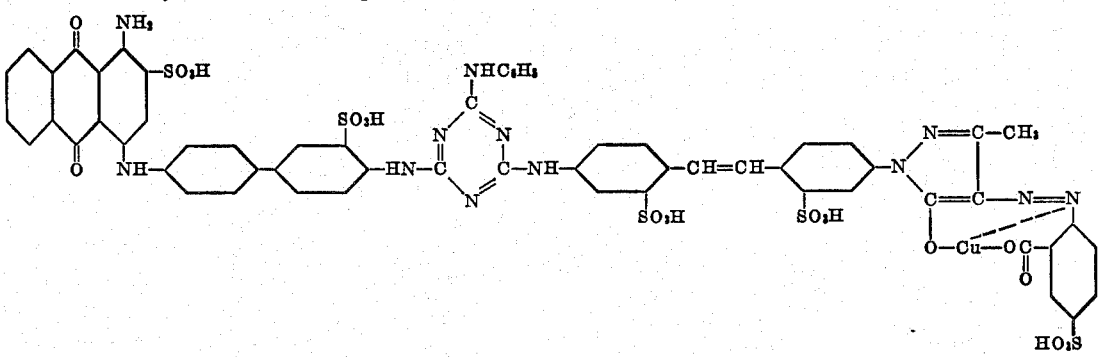
8. The azo dyestuff which corresponds to the formula
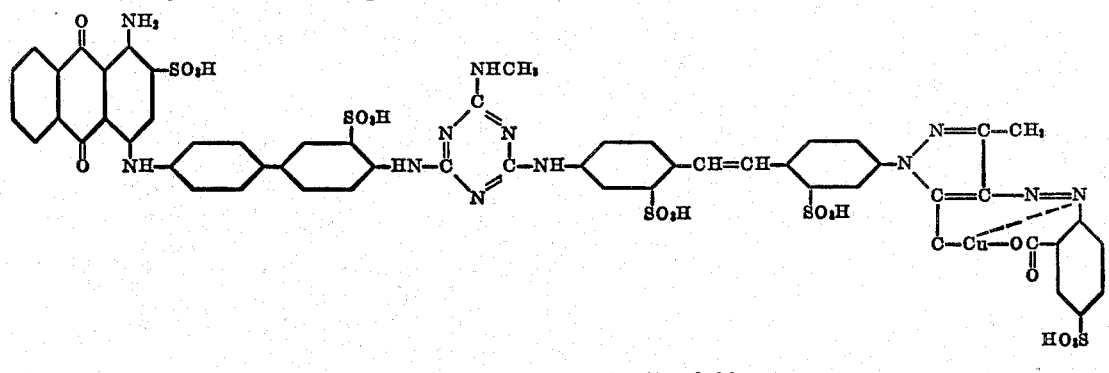
References Cited in the file of this patent
UNITED STATES PATENTS
| | | |
|---|---|---|
| 2,155,001 | Schmid | Apr. 18, 1939 |
| 2,270,748 | Schmid | Jan. 20, 1942 |
| 2,391,164 | Kaiser | Dec. 18, 1945 |

UNITED STATES PATENT OFFICE
Certificate of Correction

Patent No. 2,824,093              February 18, 1958

Jakob Benz et al.

It is hereby certified that error appears in the printed specification of the above numbered patent requiring correction and that the said Letters Patent should read as corrected below.

Column 2, line 70, for "radicals" read —radical—; column 5, line 54, for "dyeing" read —dyeings—; columns 5 and 6, formula at bottom of page, right-hand portion thereof, should appear as shown below instead of as in the patent:

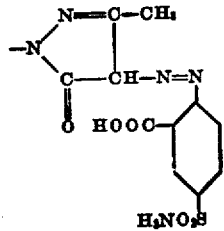

Signed and sealed this 10th day of June 1958.

[SEAL]

Attest:
KARL H. AXLINE,
*Attesting Officer.*

ROBERT C. WATSON,
*Commissioner of Patents.*